(12) United States Patent
Kim

(10) Patent No.: US 8,332,311 B2
(45) Date of Patent: *Dec. 11, 2012

(54) HYBRID ACCOUNT

(75) Inventor: Edward Kim, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/305,294

(22) Filed: Nov. 28, 2011

(65) Prior Publication Data

US 2012/0072339 A1    Mar. 22, 2012

Related U.S. Application Data

(63) Continuation of application No. 12/412,569, filed on Mar. 27, 2009, now Pat. No. 8,086,526.

(60) Provisional application No. 61/083,122, filed on Jul. 23, 2008.

(51) Int. Cl.
    *G06Q 40/00* (2006.01)
(52) U.S. Cl. ............... 705/38; 705/35; 705/39
(58) Field of Classification Search ...... 705/38
    See application file for complete search history.

(56) References Cited

U.S. PATENT DOCUMENTS

| | | | |
|---|---|---|---|
| 5,539,871 A | | 7/1996 | Gibson |
| 5,578,808 A | * | 11/1996 | Taylor ............... 235/380 |
| 5,708,845 A | | 1/1998 | Wistendahl et al. |
| 5,918,012 A | | 6/1999 | Astiz et al. |
| 5,933,817 A | * | 8/1999 | Hucal ............... 705/39 |
| 6,038,552 A | * | 3/2000 | Fleischl et al. ............... 705/44 |
| 6,097,389 A | | 8/2000 | Morris et al. |
| 6,397,196 B1 | * | 5/2002 | Kravetz et al. ............... 705/35 |
| 6,647,383 B1 | | 11/2003 | August et al. |
| 7,296,242 B2 | | 11/2007 | Agata et al. |
| 7,805,382 B2 | | 9/2010 | Rosen et al. |
| 7,885,951 B1 | | 2/2011 | Rothschild |
| 8,103,582 B1 | * | 1/2012 | Zettner ............... 705/39 |
| 2001/0034740 A1 | | 10/2001 | Kerne |
| 2001/0044825 A1 | | 11/2001 | Barritz |
| 2002/0080165 A1 | | 6/2002 | Wakefield |
| 2002/0083178 A1 | | 6/2002 | Brothers |
| 2002/0091600 A1 | * | 7/2002 | Kravetz et al. ............... 705/30 |
| 2002/0108122 A1 | | 8/2002 | Alao et al. |
| 2002/0138428 A1 | * | 9/2002 | Spear ............... 705/41 |
| 2003/0046222 A1 | * | 3/2003 | Bard et al. ............... 705/38 |
| 2003/0098877 A1 | | 5/2003 | Boegelund |
| 2003/0149983 A1 | | 8/2003 | Markel |

(Continued)

OTHER PUBLICATIONS

Asterpix—SeachLight: Content Discovery Made Easy, available at http://www.asterpix.com/searchlight/ (1 page).

(Continued)

*Primary Examiner* — Elizabeth Rosen
*Assistant Examiner* — Joan Goodbody
(74) *Attorney, Agent, or Firm* — Haynes and Boone, LLP

(57) ABSTRACT

A system, according to one embodiment, includes a hybrid account provided by an issuer to a user, the hybrid account having a balance, the balance being either positive, zero, or negative; and a financial instrument including a hybrid card, the hybrid card providing access to the hybrid account, in which transactions using the hybrid card provide interchange income to the issuer, the issuer charges interest to the hybrid account when the balance is negative, and the issuer pays interest to the hybrid account when the balance is positive.

20 Claims, 2 Drawing Sheets

U.S. PATENT DOCUMENTS

| | | | |
|---|---|---|---|
| 2004/0008226 | A1 | 1/2004 | Manolis et al. |
| 2004/0054579 | A1* | 3/2004 | Lamb et al. ............... 705/14 |
| 2004/0083080 | A1 | 4/2004 | Reghetti et al. |
| 2005/0114754 | A1 | 5/2005 | Miller et al. |
| 2005/0138193 | A1 | 6/2005 | Encarnacion et al. |
| 2005/0228749 | A1* | 10/2005 | Lozano ..................... 705/39 |
| 2006/0089843 | A1 | 4/2006 | Flather |
| 2006/0106693 | A1* | 5/2006 | Carlson et al. ............ 705/35 |
| 2006/0184574 | A1 | 8/2006 | Wu et al. |
| 2006/0195789 | A1 | 8/2006 | Rogers et al. |
| 2006/0206811 | A1 | 9/2006 | Dowdy |
| 2006/0256739 | A1 | 11/2006 | Seier et al. |
| 2007/0074110 | A1 | 3/2007 | Miksovsky et al. |
| 2007/0078989 | A1 | 4/2007 | Van Datta et al. |
| 2007/0136194 | A1* | 6/2007 | Sloan ....................... 705/41 |
| 2007/0239770 | A1 | 10/2007 | Enock et al. |
| 2007/0262995 | A1 | 11/2007 | Tran |
| 2008/0021829 | A1* | 1/2008 | Kranzley ................... 705/44 |
| 2008/0027798 | A1 | 1/2008 | Ramamurthi et al. |
| 2008/0034295 | A1 | 2/2008 | Kulas |
| 2008/0092054 | A1 | 4/2008 | Bhumkar et al. |
| 2008/0126191 | A1 | 5/2008 | Schiavi |
| 2008/0134018 | A1 | 6/2008 | Kembel et al. |
| 2008/0215680 | A1 | 9/2008 | Salesky et al. |
| 2008/0301546 | A1 | 12/2008 | Moore et al. |
| 2009/0132415 | A1 | 5/2009 | Davis et al. |
| 2009/0254515 | A1 | 10/2009 | Terheggen et al. |

OTHER PUBLICATIONS eHow How to Create a clickable image map with Dreamweaver, Feb. 16, 2008, 2 pages.

Janine C. Warner, Dreamweaver CS3 for Dummies, May 7, 2007, pp. 2, 3 and 80-83.

Using Adobe Acrobat, Apr. 9, 2004, 17 pages.

Golden Nugget—Screen shots—2 pages at media.psx.ign.com/media/000/000295/imgs_1.html.

Looks Good Works Well by Bill Scotts, Musings on Rich Web Design and User Interface Engineering—7 pages at http://looksgoodworkswell.golgspot.com/2006/03/maind-hacking-visual-transi_11437691330....

Gus Hansen's Exclusive Poker Tips Video #1 (bluffing) 0 at www.dailymotion.com/video/x3op2y_gus-hansens-exclusive-poker-tips-vi_videogames—2 pages.

Golden Nugget @ www.absolute-playstation.com/api_review/rgnugg.gtm—5 pages.

World Poker Tour Deals Twelve Million Hands of WPT Texas Hold'Em and Receives Industry Accolades: Feb. 26, 2008; 4 pages; wireless.ign.com/articles/854/854954pl.htm.

WPT Mobile; World Poker Tour; 1 page 2008; wptmobile.handson.com/wpt_texas_hold_em_2.pho?performcheck=2.

* cited by examiner

HYBRID ACCOUNT

CROSS REFERENCE TO RELATED APPLICATIONS

This application is a continuation of co-pending U.S. patent application Ser. No. 12/412,569, filed Mar. 27, 2009, and claims priority to U.S. Provisional Application No. 61/083,122, filed on Jul. 23, 2008, both of which are incorporated by reference.

BACKGROUND

1. Technical Field

Embodiments of the present disclosure generally relate to bank and credit card accounts and, more particularly, to a hybrid account combining features of both a bank account and a credit card account.

2. Related Art

Typically, consumers have both checking/savings accounts at banks and credit card accounts at credit card companies. For example, a consumer may have a debit card for the bank account and one or more credit cards for one or more credit card company accounts. In general, banks and credit card companies provide the consumer with different services and different advantages. A bank may issue debit cards which enable the consumer user to withdraw funds for a purchase or for cash directly from the user's checking or savings account. Desirable features, from the user's viewpoint, of the bank/debit account may include cash withdrawals at no additional fee, interest paid by the bank on positive balances, and difficulty in the user's spending more than what is in the bank/debit account. An undesirable feature, in the user's view, of a debit card may be the user's inability to purchase an item that costs more than what is in the account balance. Such an ability may be provided, however, by a credit card.

Credit cards typically have lines of credit given to the user by the credit card company. Thus, a user may purchase items, but not actually pay for them (i.e., pay back the credit card company) until later, e.g., for 30 days or more, which may be viewed by the user as a desirable feature of the credit card account. The user may also purchase items for which the user currently does not have sufficient funds. Other desirable features and advantages of a credit card, from the user's point of view, may include the ability to earn bonuses, rewards, or awards, based on purchases, which may include, for example, cash-back, airline miles, hotel points, and discounts from partner retailers. Additional such advantages may include protection from a transaction, such as when goods received are not as advertised or when the purchased item is not received. This protection is generally provided by the credit card companies. Some undesirable features of a credit card, in the user's view, may include the requirement that the user pay within set time periods (e.g., billing cycles), the interest charged by the credit card company on unpaid balances, fees when a user exceeds the account's credit limit, and the ability to overextend the user's financial resources by purchasing more than the user can afford to pay back.

While many consumers have both debit and credit types of cards, there are many consumers that have neither. For example, a person without any purchasing or credit history or with a bad credit history may be denied issue of a credit card from a credit card company. Also, for example, a person without a bank account, such as a person from an unbanked society, would not be able to make use of a debit card.

SUMMARY

According to one embodiment, a system includes a hybrid account provided by an issuer to a user, the hybrid account having a balance, the balance being either positive, zero, or negative; and a financial instrument including a hybrid card, the hybrid card providing access to the hybrid account, in which transactions using the hybrid card provide interchange income to the issuer, the issuer charges interest to the hybrid account when the balance is negative, and the issuer pays interest to the hybrid account when the balance is positive.

These and other features and advantages of the present invention will be more readily apparent from the detailed description of the embodiments set forth below taken in conjunction with the accompanying drawings.

Figure 1:
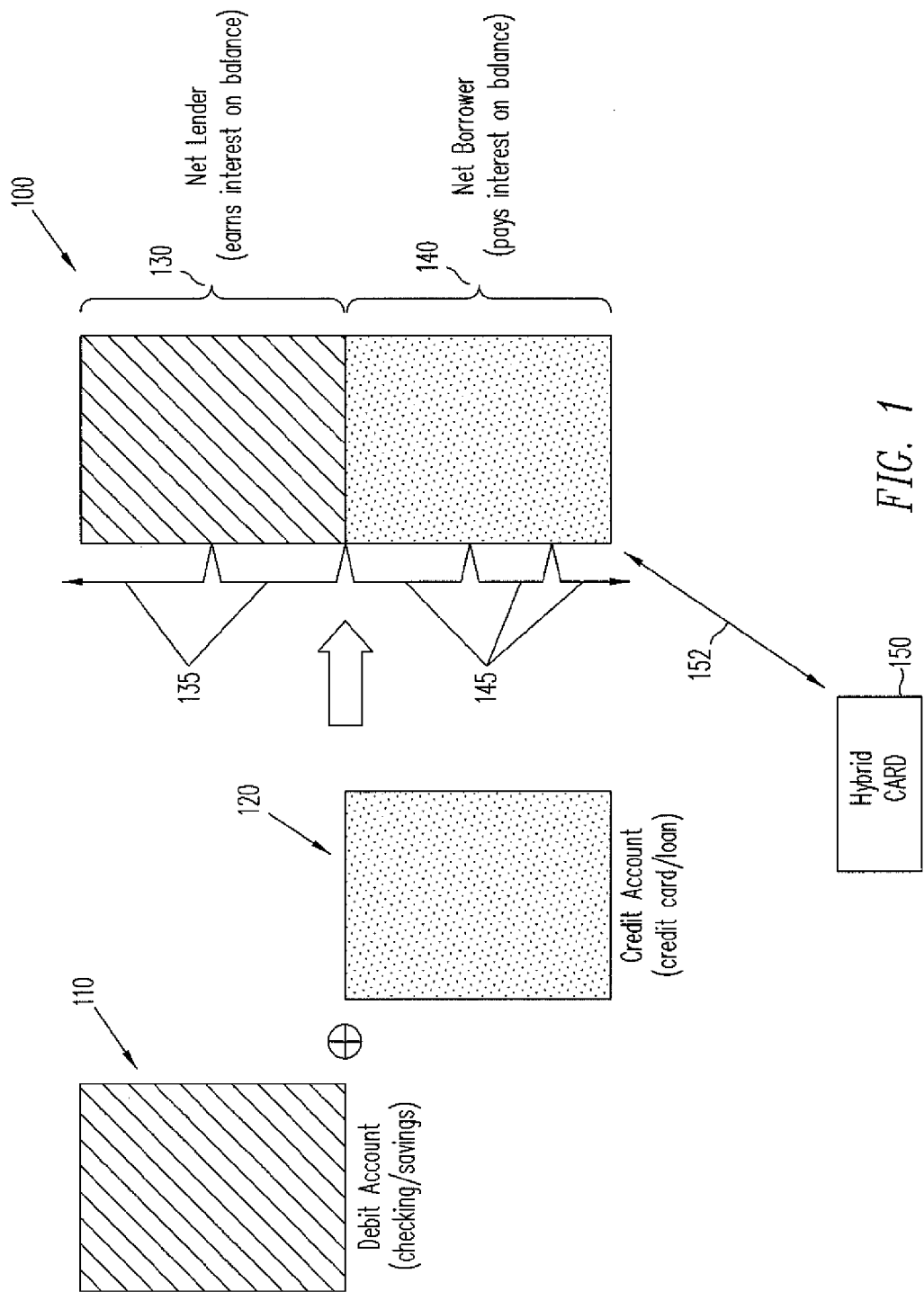
FIG. 1 is a system diagram illustrating the combining of bank account features and credit account features into a hybrid account in accordance with an embodiment of the present invention.

Exemplary embodiments and their advantages are best understood by referring to the detailed description that follows. It should be appreciated that like reference numerals are used to identify like elements illustrated in one or more of the figures, wherein showings therein are for purposes of illustrating exemplary embodiments and not for purposes of limiting the same.

DETAILED DESCRIPTION

Embodiments of the present disclosure relate to systems and methods for creating managing, and executing a hybrid account. An embodiment may include a new type of financial instrument that provides a hybrid of a debit card and a credit card, referred to as a hybrid card, that provides access to a new type of account, referred to as a hybrid account, that is created to combine various features of a bank account with a credit card account. For example, a user of the hybrid account may deposit money into and withdraw money from the hybrid account and use the hybrid card to make purchases. The hybrid account may combine interest features of the two types of accounts. For example, when the hybrid account has a positive balance, interest may be paid into the account based on the balance, and when the hybrid account has a negative balance, interest may be charged to the account based on the balance. The new type of financial instrument may provide a hybrid card and hybrid account that may be useful to consumer users by combining into one system various desirable features, the combination of which is not otherwise available from one account and instrument, while at the same time eliminating various undesirable—from the user's viewpoint—features of both conventional credit and conventional debit card accounts. For example, one apparent advantage from the user's point of view that the new financial instrument may provide is a consolidation into one account that implies no inter-account management so that the user does not need to manage between multiple accounts (e.g., transferring money from savings to checking in order to pay a credit card bill) and there are no fees associated with insufficient funds, late payments, or being over the user's credit limit. Thus, the hybrid account and hybrid card may provide a combination of advantages from bank accounts and credit cards, and may be more easily obtainable than a credit card for certain users.

Referring to FIG. 1, a hybrid account 100, in accordance with an embodiment, is created (e.g., provided by an issuer to a user) that combines a bank account (or debit card account)

110 with a credit card account 120. A user of the hybrid account 100 may deposit money into and withdraw money from the hybrid account 100. The user may also use the hybrid account 100 to make purchases, using a hybrid card 150 for access (indicated by arrow 152) to the hybrid account 100. The user may make access 152 to hybrid account 100 using hybrid card 150, for example, at a point of sale (POS) in the usual manner that a consumer would use a credit or debit card at the point of sale. Card 150 may, for example, have a card body made of plastic, showing an account number, and may have a magnetic strip, RFID (radio frequency identification) chip embedded, and other account identifiers, similar to an ordinary credit card or debit card. The account identifiers may correspond to the hybrid account for which the hybrid card 150 enables access.

When the hybrid account 100 has a positive balance (e.g., hybrid account 100 has a "net lender" status 130), interest may be paid (e.g., paid daily) into the account based on the balance amount. When the hybrid account has a negative balance (e.g., hybrid account 100 has a "net borrower" status 140), interest may be charged (e.g., charged daily) to the account based on the balance amount.

The user may deposit money (e.g., either manually or by direct deposit) or pay down (or pay off) any negative balance at any time. There may be no defined pay periods or billing cycles. Because interest may be paid or charged depending on the daily balance of the account, the hybrid account 100 may not provide a feature comparable to the typical credit card grace period, and thus, a user may, for example, not be able to take advantage of "float" by paying off balances during the grace period. On the other hand, there may be no fees (e.g. insufficient funds, late, or over-the-limit fees) charged by the issuer to the hybrid account user.

Purchases may receive benefits and rewards similar to those provided by credit cards (except for the float). For example, hybrid account 100 may earn bonuses, rewards, or awards, based on purchases. Such rewards based on purchases may include, for example, cash-back, airline miles, hotel points, and discounts from partner retailers. Benefits may include protection from a transaction, such as faulty or unsatisfactory goods or lost or damaged shipments, for example.

Each hybrid account 100 may be given a credit limit specific to the user, which can be adjusted based on user profile. All users may be given some credit, even if it is a token amount, for example, $1.00 or $5.00. When a user deposits money into hybrid account 100, the money may first be used to pay off or reduce any negative balance.

The hybrid account 100 may also have tiered or staggered rates, for example, higher credit balances are charged higher interest rates. For example, assume the interest rate for balances from 0-$5,000 is x %. When the credit balance is greater than $5,000 but less than $10,000, the interest rate may be x+2% on the amount over $5,000. So, at each interval 145 a different interest rate may be charged (or paid, e.g., for tranches 135), but only on the additional amount above the next lower interval. The intervals may be formed as tranches, e.g., a segment or tier within a loan or security for which the cash flows are segregated into intervals (e.g., tranches) and sold separately; each tranche may be a separate security with its own maturity date and interest rate; the tranches may be used to reallocate principal and interest cash flows so that some tranches have lower risk while some have higher risk. The same interest rates may be charged for all accounts, but the size of the tiered tranches 135, 145 may differ.

Another feature provided by hybrid account 100 may be the ability to increase the account's credit line, or limit, based on collateral provided by the user. For example, hybrid account 100 may be given a specified limit based on the user's profile as determined by the account provider. A user may extend or increase the credit limit, however, by providing collateral to secure the additional credit. Collateral, for example, may be any suitable transferable asset of the user. The collateral may be held, for example, in an escrow account or other instrument that maintains the collateral for both the account provider and the user.

Figure 2:
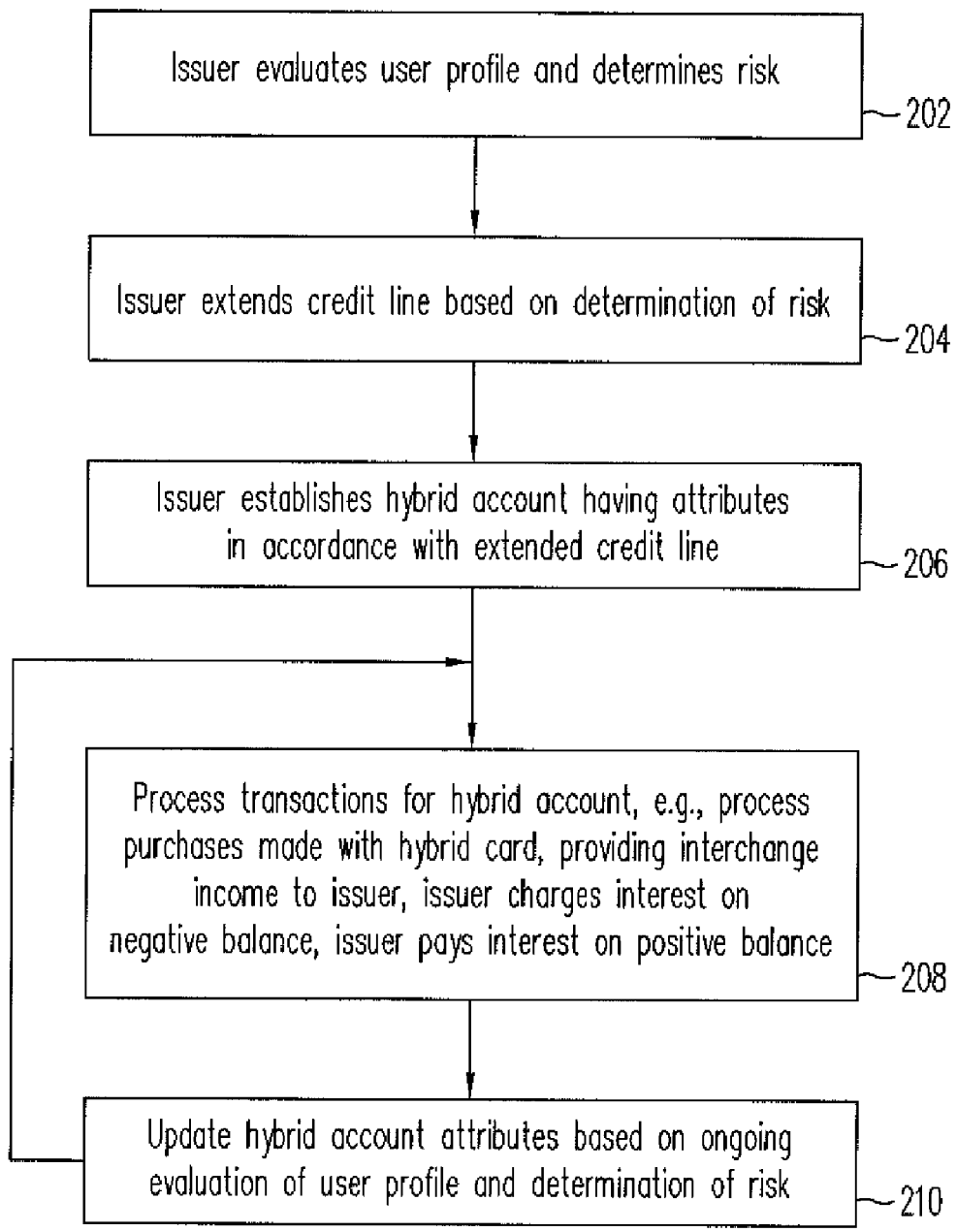
FIG. 2 is a flowchart illustrating a method of operating a hybrid account in accordance with an embodiment of the present invention.

Referring to FIG. 2, a method is illustrated for providing a hybrid account and hybrid card in accordance with an embodiment. At step 202, the issuer of the hybrid card 150 and hybrid account 100 may evaluate a user profile for a prospective user or applicant for an account. The user profile may include various attributes of a prospective user that may be useful for determining credit. For example, credit may be determined using commercial credit reports, user profiles, or previous transactions with the card issuer, or any other acceptable model. Once credit is determined, the issuer extends that credit amount to the particular user at step 204. In one scenario, high credit lines may be given to users who are just graduating college. The demographic of college graduates may not have much credit history, but the earning potential is high for members of this demographic, thus offsetting risk. Issuing a hybrid card to these users may, for example, lock in a group that may be high volume/dollar purchasers in the future, thus also offsetting risk.

At step 206, the issuer may establish a hybrid account 100 having attributes (e.g., credit limit, interest rate tiers, and cash back rates) in accordance with the extended credit line. In the example demographic of recent college graduates, because members of such a demographic (or others with little, no, or bad credit) may typically be denied credit, one feature of the hybrid card 150 and hybrid account 100 may be to issue credit to virtually anyone who applies (e.g., a 100% approval rate). For example, the credit line may be a token amount—such as one dollar, thus, encouraging the user to start using the hybrid card 150, such as by depositing funds into the hybrid card account 100. As the user continues using the hybrid card 150, the user's credit line may be increased or decreased over time (step 210) as evaluation of user profile and determination of risk may be on ongoing process. The frequency and amount of increase or decrease to the credit line may be evaluated (step 210) based on models to minimize the risk to the card company. In addition, the credit line of hybrid account 100 may be extended with collateral, for example, if the user applies for the extension and offers some acceptable form of user asset as security for the additional credit.

So, for example, if a "mostly-debit" customer (e.g., a user having a hybrid account 100 in net lender status 130, possibly due, for example, to a low starting credit line) uses hybrid card 150 frequently, resulting in interchange income for the issuing company, that income could go towards increasing the customer's (i.e., the user's) credit line. Even if the user were to default on his/her debt (e.g., a negative balance or net borrower status 140), the issuer may not be at a net loss with this user. Thus, the 100% approval feature (e.g., extending a token credit line based on determination of risk, step 204, and establishing a hybrid account having attributes in this case token credit—in accordance with extended credit line, step 206) may attract customers (i.e., users) who may not be able to initially get credit with other card companies. Such customers potentially may generate significant revenue for the hybrid card company as their earnings increase, purchases increase, and purchase amounts increase. Such customers may also develop brand loyalty, such that even when these customers can obtain credit elsewhere, they may stay with their current hybrid card and hybrid account issuer.

Continuing with FIG. 2, at step 208, all purchase transactions for hybrid account 100 may be processed similarly to credit card transactions (e.g. an interchange fee may be paid, producing interchange income for hybrid account 100). An interchange fee may be described as one of the fees merchants pay to debit and credit card issuers and payment networks to support the system for debit and credit card transactions.

Also at step 208, purchase transactions may earn the user cash back, paid as a percentage, for example, 1.0%, of the purchase amount. Cash back may be paid to the hybrid account 100 in the form of a daily or weekly, for example, statement credit (which, for example, may be rounded down). Transactions processed through the hybrid account 100 issuer (e.g., PayPal™, Inc. of San Jose, Calif.) may earn the user an additional cash back, e.g., 0.5% for a total of 1.5%. Transactions exceeding the available credit line of hybrid account 100 may be declined. Accruing interest charged to balances having net borrower status 140, however, may not trigger an over-the-limit fee. Deposits may be made into hybrid account 100 using direct deposit. Access to physical cash may be provided via participating bank ATMs and may be treated as a cash advance for a balance having net borrower status 140 or as a withdrawal for a balance having a net lender status 130.

Net lenders (e.g., users with a hybrid account 100 balance having net lender status 130) may earn competitive interest rates (e.g., an interest rate that is close—e.g., within 1.0%—or equal to the risk-free rate). Net borrowers (e.g., users with a hybrid account 100 balance having net borrower status 140) may be charged competitive interest rates (e.g., a rate that is substantially the same or lower than that currently charged by the issuer's credit card company competitors). Tiered interest rates, as described above, may be charged on net borrower balances. The same interest rates may be charged for all accounts, but the size, however, of the tiered tranches may differ. Cash advance balances may be treated like purchase balances. Net borrower balances (e.g., balances having net borrower status 140) with highest interest charges (e.g., highest interest rates) may be paid down first. Interest rates may be variable and calculated as a function of the prime rate.

Also at step 208, transactions may be settled daily (e.g., an auto sweep may be performed). While there may be no defined pay periods or billing cycles, an account statement may be issued periodically, e.g., daily or monthly. There may be no due date for outstanding balances in hybrid account 100, e.g., the balance may have a net borrower status 140. There may be no charging to hybrid account 100 of fees such as insufficient funds fees (e.g. balance may shift from net lender status 130 to net borrower status 140), late fees (e.g., there are no due dates), or over-the-limit fees (e.g., over-limit transactions may be declined).

EXAMPLE ONE

The following example illustrates a scenario in which user One may earn more interest income from hybrid account 100 than from a traditional combination of a bank account and a credit card account.

In the traditional scenario, user One owns and uses a credit card for almost all of her purchases. Although user One has more than enough money in her checking and savings accounts, user One prefers to use her credit card because she likes the 1% cash back her credit card company pays. User One pays her credit card balance off in full every month because user One does not want to pay any interest on her credit card balance. User One spends about $1,000 a month on her credit card. User One keeps a balance of about $5,000 in her checking account, which user One uses to pay off her credit card balance every month (as well as for other expenses such as rent), and $20,000 in her savings account, which yields 3% annually. User One has shopped around and has found the 3% to be competitive. In a typical month, user One earns $49 from her savings account and gets $10 cash back from her credit card company. User One is satisfied with her traditional accounts but has some concerns since she may forget to pay her credit card bill on time every once in a while, which may cost her $40. User One also does not like managing three separate accounts.

In the hybrid account scenario, user One receives the same 3% on her balance and also receives 1% cash back on all her purchases. User One's spending level remains the same at about $1,000 a month and the average balance in her hybrid account may be at least about $24,000. In a typical month, this balance earns her $59 or more and she still gets $10 cash back for her purchases. User One receives more money at the end of the month and does not have to worry about being late with a payment to the credit card company. User One also has less accounts to manage, which may save her valuable time.

EXAMPLE TWO

The following example illustrates a scenario in which user Two views interest charges as being more fair with a hybrid account than with a traditional combination of a bank account and a credit card account.

In the traditional scenario, user Two owns a credit card with a $2,000 credit line. He utilizes most of this line and pays off only the minimum payment every month. Last month, user Two was late with his payment so his credit card company charged him a $40 late fee and increased the interest rate on his outstanding balance to 25%. Prior to that, user Two was being charged 13% on his purchase balance and 20% on his cash advance balance. User Two also did not like the fact (before he was late with his payment) that when he would make a payment, it would pay off his purchase balance first, as opposed to his cash advance balance, which is charged a higher interest rate.

In the hybrid account scenario, user Two has a hybrid account with a credit line of $2,000. User Two transferred his outstanding credit card balance to his hybrid account. The blended interest rate provided by the hybrid account (e.g., 11%) is lower than his credit card rate. User Two may also pay his balance off over time as user Two is able. There is no due date with user Two's hybrid account, so user Two no longer has to worry about being late with a payment. And when user Two does make a payment, the payment is applied first to balances charged at the highest interest rate.

EXAMPLE THREE

The following example illustrates a scenario in which online shoppers have a greater incentive to use a hybrid account than a traditional combination of a bank account and a credit card account.

In the traditional scenario, user Three uses his favorite credit card for all his online purchases because he enjoys the protection his credit card company offers when he shops online as well as the 1% cash back he gets on all of his purchases. User Three does a lot of shopping online. User Three also has $15,000 in an online savings account, which yields 2.75% annually.

In the hybrid account scenario, a hybrid account gives 1.5% cash back on all online purchases through the account issuer (e.g., PayPal™) and 1% cash back on all other purchases, which is better than user Three's traditional credit card company.

The hybrid account may also be structured so that user Three receives something between 1% and 1.5% from purchases made in conjunction with PayPal™. User Three did not think he could get more than 1% cash back on non-PayPal™ online purchases but he was pleasantly surprised when he found out that when he makes purchases using hybrid account 100 through the account issuer PayPal™ the PayPal™ hybrid account will give 1.25% cash back on his purchases. User Three now uses PayPal™ for virtually all of his online purchases.

Since user Three shops online so much and with so many online merchants and other online sellers accepting PayPal™, user Three receives greater cash back by simply using the account issuer (e.g., PayPal™). Since user Three has $15,000 sitting in an online savings account earning 2.75% annually and because user Three does not want to pay interest on his hybrid account purchases, user Three transfers the $15,000 to his hybrid account. The hybrid account 100 pays user Three 3% annually on net lender balances (balances having net lender status 130).

EXAMPLE FOUR

The following example describes a scenario which illustrates "self-selection", e.g. the tendency of customers, who would be unprofitable for the issuer of a hybrid account and whom the issuer would prefer to select out, to select themselves out, i.e., not to make use of the hybrid account, preferring a traditional combination of a bank account and a credit card account instead.

In the traditional scenario, user Four has excellent credit. User Four would probably be approved for any credit product she wanted to apply for. Although, user Four has plenty of money, user Four still owns and uses several credit cards. User Four has one credit card that she uses for all her purchases because of its competitive cash back program. User Four has two other credit cards with a combined $8,000 in outstanding balances. User Four takes advantage of introductory 0% balance transfers to avoid paying interest. For example, user Four was able to perform a 0% balance transfer for 12 months on the one credit card and 15 months on the other credit card. And, user Four may perform another balance transfer once her current introductory periods end. If user Four is not able to open another account where she can move her balance, user Four may just pay it all off. Thus, this type of customer is not profitable to credit card companies (and also not to hybrid account issuers).

In the hybrid account scenario, user Four recently heard about the hybrid account and decided to investigate it. From a credit standpoint, user Four did not appreciate advantages offered by the hybrid account. The hybrid account 100 did not offer any type of 0% balance transfer offers and charges interest on net borrower 140 balances starting on day one. Credit card companies allowed user Four to borrow interest-free until her bill due date unlike the interest charged by hybrid account 100 on net borrower 140 balances. Thus, user Four concluded that she has no reason to open a hybrid account.

In implementation of the various embodiments, the hybrid account may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system. The issuer may store hybrid account information on a server with memory and a processor, for example, to determine credit line, store user information, and process interest rates charged and credited.

In this regard, a computer system may include a bus or other communication mechanism for communicating information, which interconnects subsystems and components, such as processing component (e.g., processor, micro-controller, digital signal processor (DSP), etc.), system memory component (e.g., RAM), static storage component (e.g., ROM), disk drive component (e.g., magnetic or optical), network interface component (e.g., modem or Ethernet card), display component (e.g., CRT or LCD), input component (e.g., keyboard or keypad), and/or cursor control component (e.g., mouse or trackball). In one embodiment, disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable medium, which may refer to any medium that participates in providing instructions to the processor for execution. Such a medium may take many forms, including but not limited to, non-volatile media, volatile media, and transmission media. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted.

In various embodiments, execution of instruction sequences for practicing the invention may be performed by a computer system. In various other embodiments, a plurality of computer systems coupled by communication link (e.g., LAN, WLAN, PTSN, or various other wired or wireless networks) may perform instruction sequences to practice the invention in coordination with one another.

Computer system may transmit and receive messages, data, information and instructions, including one or more programs (i.e., application code) through communication link and communication interface. Received program code may be executed by processor as received and/or stored in disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system comprising:
a processor, and
a data storage device including a computer-readable medium having computer readable code for instructing the processor, and when executed by the processor performs operations comprising:
establishing by the processor a hybrid account that is one consolidated account having attributes according to an extended credit line and having a balance, the balance capable of being one of positive, zero, and negative, and having no billing cycles, wherein the hybrid account is provided by an issuer to a user;
charging interest by the processor to the hybrid account when the balance is negative, wherein there is no payment due date for a negative balance; and
paying interest to the hybrid account when the balance is positive.

2. The system of claim 1, further comprising:
a hybrid card providing access to the hybrid account, wherein transactions using the hybrid card provide an interchange income to the issuer.

3. The system of claim 1, wherein:
an interchange income provided to the issuer is used to increase a credit line for the user of the hybrid account.

4. The system of claim 1, further comprising:
a hybrid card providing access to the hybrid account, wherein:
a purchase transaction using the hybrid card earns a cash back credit to the hybrid account; and
an amount of the cash back credit is a specified percentage of an amount of the purchase transaction.

5. The system of claim 1, wherein transactions for the hybrid account are settled daily.

6. The system of claim 1, wherein:
when the hybrid account has a net lender status, comprising a positive balance, the hybrid account is paid an interest rate that is close or equal to the risk free rate.

7. The system of claim 1, wherein:
when the hybrid account has a net borrower status, comprising a negative balance, the hybrid account is charged a competitive interest rate.

8. The system of claim 1, wherein an interest rate is variable and the interest is a function of the prime rate.

9. The system of claim 1, wherein negative balance amounts are divided into tranches, each tranche having a corresponding interest rate.

10. The system of claim 1, wherein positive balance amounts are divided into tranches, each tranche having a corresponding interest rate.

11. A computer-implemented method comprising:
providing, by a processor, access to a hybrid account via a hybrid card, wherein the hybrid card includes:
a card body; and
an identifier on the card body that corresponds to the hybrid account so that the hybrid card provides access to the hybrid account;
managing the hybrid account, by the processor, as one consolidated account, having an account balance, the account balance being either positive, zero, or negative, with no billing cycles;
charging interest, by the processor, on the account balance when the account balance is negative, wherein there is no payment due date for a negative balance; and
paying interest, by the processor, on the account balance when the account balance is positive.

12. The method of claim 11, wherein managing the hybrid account includes providing attributes according to an extended credit line, the attributes including a credit limit, and a percentage rate for cash back payments.

13. The method of claim 11, further comprising: providing an interchange income to an issuer of the hybrid card for transactions using the hybrid card.

14. The method of claim 11, further comprising: using an interchange income provided to an issuer of the hybrid card to increase a credit line for a user of the hybrid card.

15. The method of claim 11, further comprising: paying cash back to the hybrid account including paying the hybrid account from an interchange fee earned by using the hybrid card.

16. The method of claim 11, further comprising:
crediting the hybrid account with a cash back credit, wherein:
a purchase transaction using the hybrid card earns the cash back credit to the hybrid account; and
an amount of the cash back credit is a specified percentage of an amount of the purchase transaction.

17. The method of claim 11, further comprising:
extending an extended credit line for the hybrid account according to a determination of risk based on a result of evaluating a user profile.

18. The method of claim 11, further comprising:
extending a credit line for the hybrid account to a user with a credit limit that is based on a determination of risk.

19. The method of claim 11, further comprising:
when the hybrid account has a net lender status, comprising a positive balance, paying the hybrid account an interest rate that is close or equal to the risk free rate.

20. The method of claim 11, further comprising:
when the hybrid account has a net borrower status, comprising a negative balance, charging the hybrid account a competitive interest rate.

* * * * *